United States Patent [19]
Teuber et al.

[11] Patent Number: 5,328,117
[45] Date of Patent: Jul. 12, 1994

[54] REEL PRESSURE BUTTON FOR TAPE REELS

[75] Inventors: Vincent P. Teuber; Robert L. Hanson, both of St. Paul, Minn.

[73] Assignee: Minnesota Mining and Manufacturing Company, St. Paul, Minn.

[21] Appl. No.: 898,378

[22] Filed: Jun. 9, 1992

Related U.S. Application Data

[63] Continuation-in-part of Ser. No. 624,876, Dec. 3, 1990, abandoned.

[51] Int. Cl.[5] .................. G11B 23/037; G11B 23/027; B65H 75/02
[52] U.S. Cl. ................. 242/578.3; 242/345.2
[58] Field of Search ................. 242/197–200, 242/71.8; 360/132

[56] References Cited

U.S. PATENT DOCUMENTS 4,520,969 6/1985 Wulfing et al. ............... 242/71.8
4,752,046 6/1988 Wulfing ....................... 242/71.8
4,887,775 12/1989 Kanaguchi et al. ............ 242/199
4,896,238 1/1990 Oogi et al. ................... 242/199

Primary Examiner—Daniel P. Stodola
Assistant Examiner—John Q. Nguyen
Attorney, Agent, or Firm—Gary L. Griswold; Walter N. Kirn; Charles D. Levine

[57] ABSTRACT

A reel pressure button assembly is used in a magnetic tape reel cassette for applying pressure to a tape reel. The reel pressure button assembly includes a substantially cylindrical reel pressure button and a portion of the cassette housing. The reel pressure button is formed as an integral, one-piece member and includes a central horizontal portion which is disposed within an opening in the cassette housing portion. A cylindrical portion of the button has a plurality of recesses and terminates in a flange. The housing portion includes a plurality of tabs which are received in respective recesses to secure the reel pressure button to the housing portion. A compression spring is mounted between the housing portion and the reel pressure button flange.

11 Claims, 3 Drawing Sheets

REEL PRESSURE BUTTON FOR TAPE REELS

This is a continuation-in-part of application Ser. No. 07/624,876 filed Dec. 3, 1992, now abandoned.

TECHNICAL FIELD

The present invention relates to hold down buttons used in video cassette cartridges. More particularly, the present invention relates to hold down buttons having a simple construction.

BACKGROUND OF THE INVENTION

Magnetic tape cassettes used in video cassette recorders include a pair of tape reels mounted in the cassette housing. Typically, these cassettes include a device which places a downward axial force on the tape reels to maintain proper position and rotation of the tape reels, particularly as the cassette is loaded into the recorder. Some cartridges use reel springs mounted on the upper housing of the cassette and other cassettes use axial pressure buttons mounted in the upper housing of the cassette. Betacam-L type cassettes, for example, use pressure buttons.

FIG. 1 illustrates a known hold-down or reel pressure button assembly. This button assembly requires a plurality of components. The button assembly 10 is mounted within an opening 12 in the window 14 of the cassette upper housing wall. The button assembly 10 is mounted over the axial center of a tape reel 16 with an inner button 18 contacting the tape reel 16. The inner button 18 includes a central horizontal portion 20 on which a cylindrical upwardly extending portion 22 is mounted. Two opposing openings 24 are formed in the central horizontal portion 20 inside of the cylindrical upwardly extending portion 22. Two opposing recesses 26 are formed in the inside surface of the cylindrical upwardly extending portion 22 adjacent the openings 24. A cylindrical downwardly extending portion 28 is formed on the lower surface of the central horizontal portion 20 and has a larger diameter than the upwardly extending portion 22. The downwardly extending portion 28 terminates in a circular horizontal flange 30.

A wear pad 32 can be mounted to the tape reel 16 to provide a contact surface with the inner button 18. The wear pad 32 provides a surface of high lubricity and wear resistance. A button cap 34 is mounted within the cylindrical upwardly extending portion 22 and includes two downwardly extending legs 36 which extend through the two openings 24 in the central horizontal portion 20 of the inner button 18. Each leg 36 terminates in an outwardly facing tab 38 which is received in a respective recess 26 in the inner button 18 to frictionally lock the button cap 34 to the inner button 18. A coil spring 40 is mounted around the inner button 18 and between the window 14 and the circular horizontal flange 30 of the inner button 18.

While this configuration adequately performs its intended purpose, it has numerous drawbacks. The multiple part assembly is relatively complex in design and is difficult and expensive to manufacture and assemble. The button cap 34 can relatively easily disengage from the inner button 18 and damage the assembly 10. Moreover, in the event of failure of the frictional lock between the button cap tabs 38 and the inner button recesses 26, the disengaged button cap 34 can damage the cassette recorder or create a flying missile safety hazard if it disengages while the cassette is being handled.

SUMMARY OF THE INVENTION

The hold down or reel pressure button assembly of the present invention improves upon known reel pressure buttons of the type described above by using a simple, one piece reel pressure button which is easy and inexpensive to manufacture. No complex assembly is required. Unlike the complex known assemblies, once the one piece reel pressure button is mounted in the cassette, the button is secured in position by the tape reels themselves and the button can not be inadvertently removed.

The reel pressure button assembly is used in a magnetic tape reel cassette for applying pressure to a tape reel in the tape cassette. The reel pressure button assembly includes a substantially cylindrical reel pressure button, a portion of the cassette housing, and a compression spring. The reel pressure button is formed as an integral, one-piece member and includes a central horizontal portion which is disposed within an opening in the cassette housing portion. A substantially cylindrical portion extends downwardly from the central horizontal portion and terminates in a flange, and has a plurality of recesses. The compression spring is disposed between the cassette housing portion and the reel pressure button flange. A metal contact plate can be mounted to the under surface of the upper horizontal portion to reduce wear on the button and the tape reel.

The cassette housing portion includes a plurality of tabs which correspond in number to the number of reel pressure button recesses, and are received in respective recesses to secure the reel pressure button to the cassette housing. Additionally, a plurality of posts are formed on the cassette housing portion and are received in a plurality of recesses formed in the reel pressure button. The interaction of the posts in the openings stabilizes the reel pressure button to limit tilting and wobbling of the button.

DETAILED DESCRIPTION OF PREFERRED EMBODIMENTS

Figure 3:
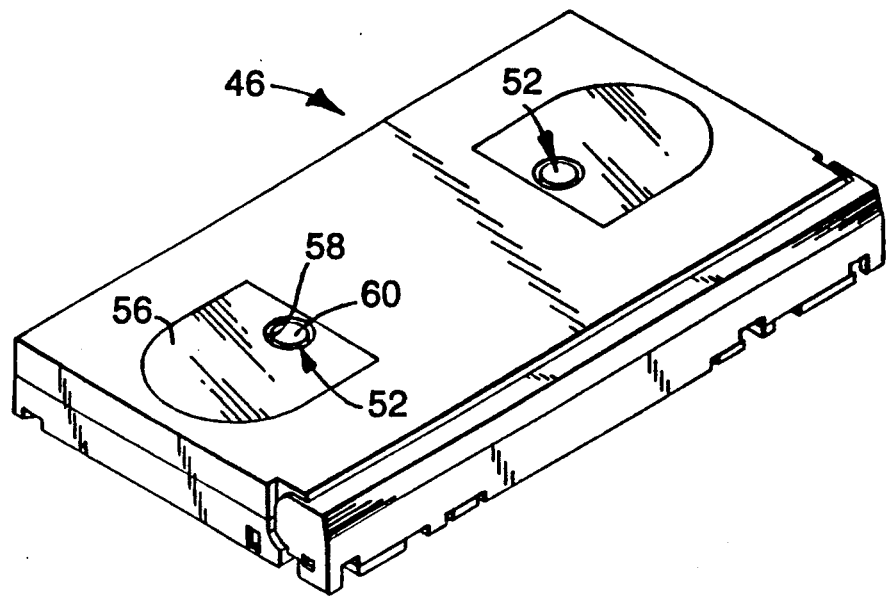
FIG. 3 is a perspective view of a cassette having the reel pressure button of FIG. 2.

The hold down or reel pressure button assembly 50 is used in a magnetic tape reel cassette 46, shown in FIG. 3, for applying pressure to a tape reel 48 in the tape cassette 46. The reel pressure button assembly 50 uses a simple, one piece reel pressure button 52 which is easy and inexpensive to manufacture. No assembly is required. Once the one piece reel pressure button 52 is mounted in the cassette 46, the button is secured in position by the tape reels 48 and can not be inadvertently removed even if the securing means fails.

Figure 1:
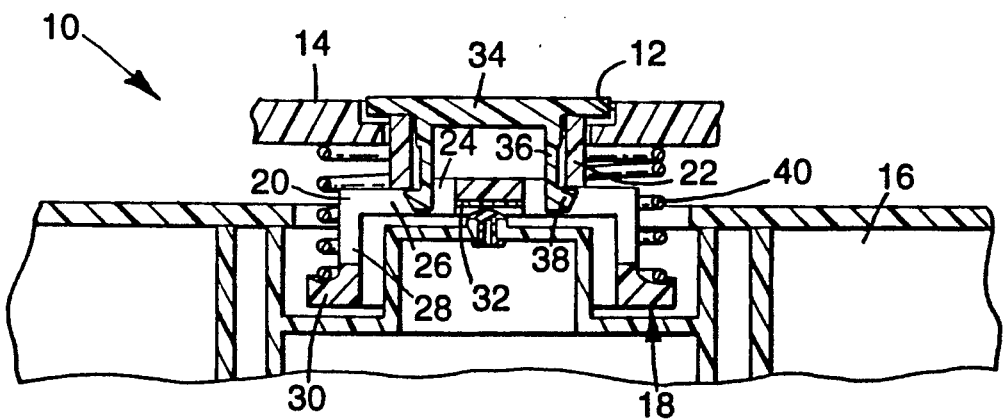
FIG. 1 is a cross-sectional view of a prior art reel pressure button and a portion of a cassette to which the reel pressure button is mounted.
Figure 2:
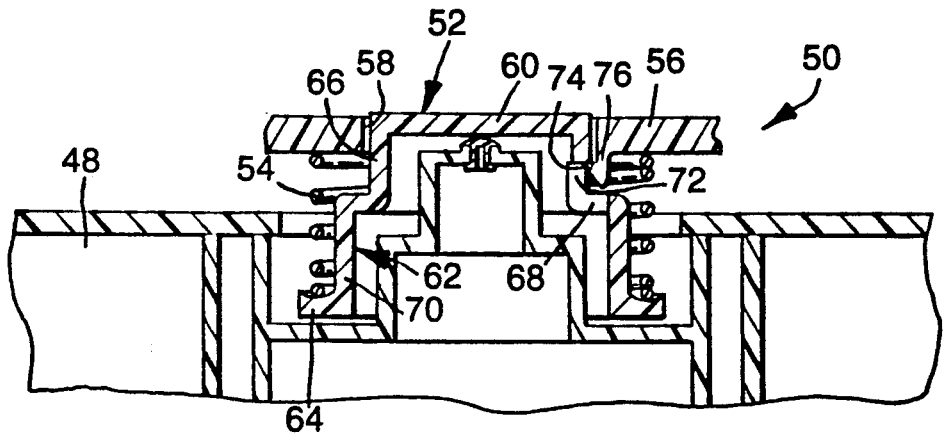
FIG. 2 is a cross-sectional view of the reel pressure button according to the present invention and a portion of a cassette to which the reel pressure button is mounted.
Figure 4:
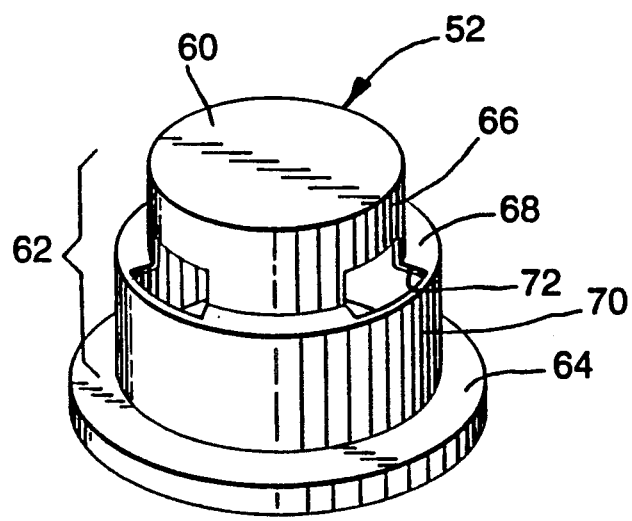
FIG. 4 is a perspective view of the reel pressure button of FIG. 2.

Referring particularly to FIGS. 2 and 4, but also to FIG. 3, the reel pressure button assembly 50 includes a substantially cylindrical reel pressure button 52, a portion of the cassette housing, and a coil-type compression spring 54. The portion of the cassette housing is typically a window 56 which permits viewing the tape inside the cassette. The window 56 has an opening 58 which receives the reel pressure button 52. The reel pressure button 52 is an integral, one-piece member, preferably formed by molding. Although the reel pressure button 52 is shown as being cylindrical with circular surfaces, the reel pressure button 52 and the other elements of the reel pressure assembly 50, such as the opening 58, can assume other shapes and configurations. The reel pressure button assembly 50 is mounted over the axial center of and contacts a tape reel 48.

The reel pressure button 52 includes an upper circular horizontal portion 60 which is disposed within the opening 58 in the window 56. A substantially cylindrical portion 62 of the reel pressure button 52 extends downwardly from the upper circular horizontal portion 60 and terminates in a flange 64. The compression spring 54 is receivable between the window 56 and the reel pressure button flange 64. Preferably, as illustrated in the figures, the cylindrical portion 62 includes an upper cylindrical portion 66, a central horizontal portion 68, and a lower cylindrical portion 70. This configuration improves the frictional engagement between the reel pressure button 52 and the window 56 discussed below.

A plurality of recesses, shown as openings 72, are formed bridging the outer surface of the upper cylindrical portion 66 and the central horizontal portion 68 of the substantially cylindrical portion 62. The opening 58 in the window 56 receives the reel pressure button 52 and the window 56 also includes a plurality of tabs 74, extending from legs 76 along the circumference of the window opening 58. The legs 76 and tabs 74 preferably are molded as one piece with the window 56. Each tab 74 and leg 76 corresponds to a reel pressure button opening 72. Each leg 76 extends through its respective opening 72 and into the interior of the reel pressure button 52. As the reel pressure button 52 axially shifts in response to external pressure, the button rides on the legs 76. The tabs 74 are frictionally received in respective openings 72 and engage a portion of the under surface of the central horizontal portion 68 to prevent the reel pressure button 52 from being forced away from the window 56. Preferably, three openings 72 and tabs 74 are used. Alternatively, the legs 76 and tabs 74 could engage openings 72 formed on the inside of the reel pressure button 52 by extending through the upper horizontal portion 60 of the button 52.

In an alternative embodiment shown in FIGS. 5-8, in addition to the leg 76 and opening 72 interaction, D-shaped posts 78 are formed along the circumference of the window opening 58, one post 78 in between each leg 76. The posts 78 are received in respective openings 80 formed in the central horizontal portion 68 of the substantially cylindrical portion 62 of the reel pressure button 52. The interaction of the posts 78 in the openings 80 stabilizes the reel pressure button 52 with respect to the cassette 46 to limit tilting and wobbling of the button 52 and to stabilize the button 52. Additionally, axial grooves 82 extending from the openings 80 are formed in the inner surface of the lower cylindrical portion 70 of the cylindrical portion 62 of the reel pressure button 52. The grooves 82 receive the posts 78 and the button 52 rides on both the posts 78 and the legs 76.

Figure 8:
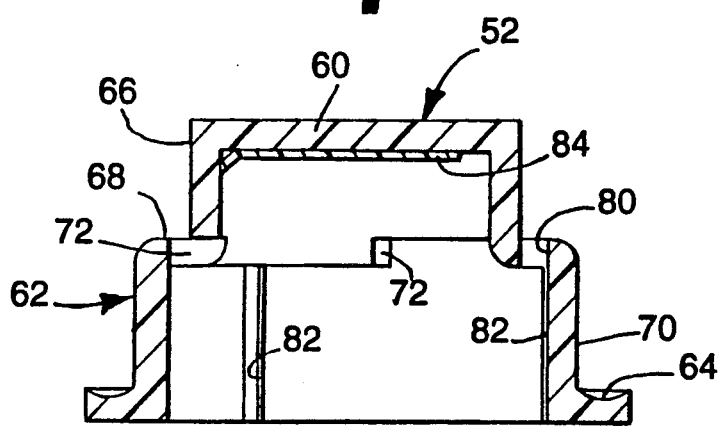
FIG. 8 is a cross-sectional view of the reel pressure button taken along line 8—8 of FIG. 6.
Figure 5:
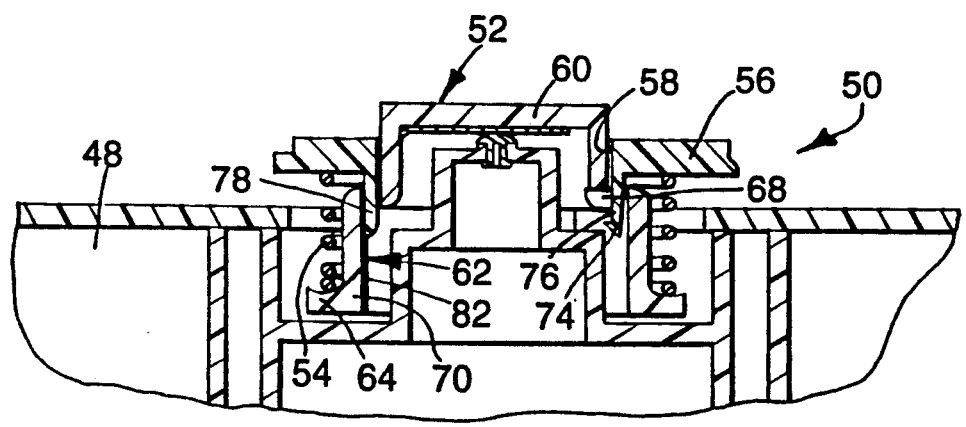
FIG. 5 is a cross-sectional view of another embodiment of the the reel pressure button of the present invention and a portion of a cassette to which the reel pressure button is mounted.
Figure 6:
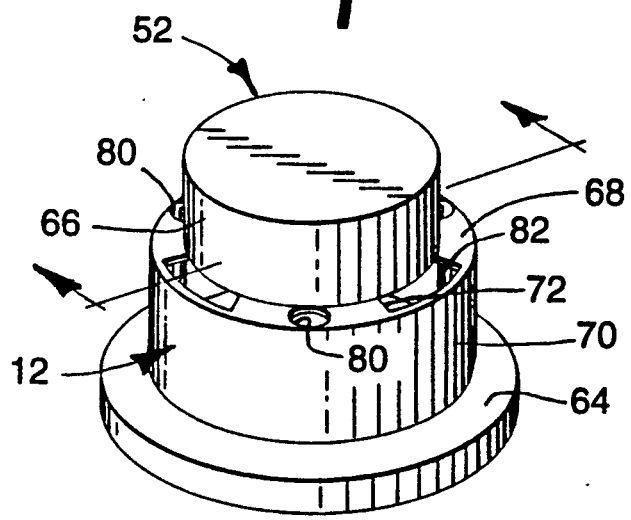
FIG. 6 is a perspective view of the reel pressure button of FIG. 5.
Figure 7:
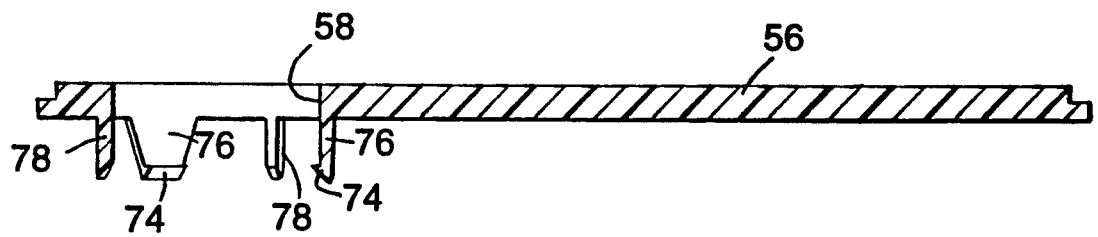
FIG. 7 is a cross-sectional view of the portion of the cassette to which the reel pressure button is mounted.

As a further modification of the reel pressure button 52, a metal contact plate 84 can be mounted to the under surface of the upper horizontal portion 60 as best shown in FIGS. 5 and 8. The metal contact plate 84 contacts the plastic tape reel 48 and reduces wear on the button 52 and the tape reel 48 as compared with a plastic-plastic interface without the contact plate 84. Preferably, the contact plate 84 is made of hardened steel. The contact plate 84 can be generally triangular and slightly larger than the inner diameter of the upper cylindrical portion 66 so that the contact plate 84 can be secured against the upper horizontal portion 60 simply by wedging between the walls of the upper cylindrical portion 66.

Proper design and selection of the compression spring 54 enables the reel pressure button assembly 50 to achieve a gram loading of approximately 350 grams near the middle of the 305 to 395 gram specification range specified for all Betacam-L cassettes. This gram load is attained when the tape reel 48 is lifted by the drive spindle of the tape recorder, as occurs in a typical cassette.

Numerous characteristics, advantages, and embodiments of the invention have been described in detail in the foregoing description with reference to the accompanying drawings. However, the disclosure is illustrative only and the invention is not intended to be limited to the precise embodiments illustrated. Various changes and modifications may be effected therein by one skilled in the art without departing from the scope or spirit of the invention.

We claim:

1. A reel pressure button assembly for applying pressure to a tape reel in a tape cassette housing having a cassette housing portion, the reel pressure button assembly comprising:

a reel pressure button formed as an integral, one-piece member and including a flange and adapted to engage the tape reel, the reel pressure button having an uppermost horizontal portion which contacts the tape reel and a body portion extending downwardly from the uppermost horizontal portion and terminating in the flange; and means including the tape reel and the cassette housing portion for securing the reel pressure button to the cassette housing portion, wherein the reel pressure button assembly is sized to prevent any part of the reel pressure button assembly from being removed from the tape cassette housing without disassembling the tape cassette housing even if the securing means fails.

2. The reel pressure button assembly of claim 1 further comprising a biasing device, wherein the biasing device comprises a compression spring and is receivable between the cassette housing portion and the reel pressure button flange.

3. The reel pressure button assembly of claim 1 wherein the cassette housing portion includes an opening which receives the reel pressure button.

4. The reel pressure button assembly of claim 3 wherein the reel pressure button includes a horizontal portion which is substantially parallel to the cassette housing portion and which is disposed within the cassette housing opening and a substantially cylindrical portion extending from the horizontal portion to connect the horizontal portion and the flange.

5. The reel pressure button assembly of claim 4 further comprising a contact plate mounted to the under surface of the horizontal portion, wherein the contact plate contacts the tape reel to reduce wear on the reel pressure button and the tape reel.

6. The reel pressure button assembly of claim 1 wherein the reel pressure button includes a plurality of first openings and the securing means comprises
a corresponding number of legs formed on and extending substantially perpendicular to and toward the inside of the cassette housing portion, wherein the legs are received in respective first openings, wherein the reel pressure button rides on the legs as it axially shifts in response to external pressure.

7. The reel pressure button assembly of claim 6 wherein the securing means further comprises a tab extending from each leg, wherein the tabs engage a portion of the reel pressure button to prevent the reel pressure button from being forced away from the cassette housing portion.

8. The reel pressure button assembly of claim 6 wherein the cassette housing portion includes a plurality of posts and the securing means further comprises
a plurality of second openings formed in the reel pressure button corresponding in number to the posts, wherein the posts are received in respective second openings and the interaction of the posts in the second openings stabilizes the reel pressure button with respect to the cassette housing portion.

9. The reel pressure button assembly of claim 8 wherein the shape of the posts differs from the shape of the legs and the shape of the second openings differs from the shape of the first openings and corresponds to the shape of the posts.

10. A reel pressure button assembly for applying pressure to a tape reel in a tape cassette housing having a cassette housing portion, the reel pressure button assembly comprising:
a reel pressure button formed as an integral, one-piece member and including an uppermost horizontal portion which contacts the tape reel, a body portion extending downwardly from the uppermost horizontal portion and terminating in a flange, and a plurality of first openings formed in the body portion;
a plurality of legs formed on the cassette housing portion and corresponding in number to the number of reel pressure button first openings, wherein each leg is received in a respective first opening and wherein the reel pressure button rides on the legs as it axially shifts in response to the external pressure;
a tab extending from each leg, wherein the tabs engage a portion of the reel pressure button to prevent the reel pressure button from being forced away from the cassette housing and wherein the tape reel assists in securing the reel pressure button to the cassette housing portion and wherein the reel pressure button assembly is prevented from being removed from the tape cassette housing without disassembling the tape cassette housing;
a plurality of posts formed on the cassette housing portions;
a plurality of second openings formed in the reel pressure button corresponding in number to the posts, wherein the posts are received in respective second openings and the interaction of the posts in the second openings stabilizes the reel pressure button with respect to the cassette housing to stabilize the reel pressure button;
an opening adjacent the tabs and disposed in the cassette housing portion for receiving the reel pressure button; and
a compression spring, disposed between the cassette housing portion and the reel pressure button flange.

11. The reel pressure buttonassembly of claim 10 wherein the body portion comprises:
an upper cylindrical portion extending from the uppermost horizontal portion;
a lower cylindrical portion having a diameter greater than that of the upper cylindrical portion and terminating in the flange; and
a central horizontal portion connecting the upper and lower cylindrical portions.

* * * * *